(12) United States Patent
Kale et al.

(10) Patent No.: US 7,549,037 B1
(45) Date of Patent: Jun. 16, 2009

(54) EFFICIENT OFF-HOST BACKUP OF A FILE SET CLONE

(75) Inventors: Sanjay Ramchandra Kale, Pune (IN); Kuldeep Sureshrao Nagarkar, Pune (IN); Dulipsinh H. Deshmukh, Pune (IN); Shishir S. Asgaonkar, Pune (IN); Shailesh Waman Chaudhari, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 493 days.

(21) Appl. No.: 11/218,129

(22) Filed: Sep. 1, 2005

(51) Int. Cl.
*G06F 9/34* (2006.01)
(52) U.S. Cl. ........................ 711/218; 711/219
(58) Field of Classification Search .................. None
See application file for complete search history.

(56) References Cited

U.S. PATENT DOCUMENTS

| | | | |
|---|---|---|---|
| 6,434,681 B1 * | 8/2002 | Armangau | 711/162 |
| 7,334,094 B2 * | 2/2008 | Fair | 711/161 |
| 2004/0003314 A1 * | 1/2004 | Witt et al. | 714/6 |
| 2005/0198113 A1 * | 9/2005 | Mohamed et al. | 709/203 |

* cited by examiner

*Primary Examiner*—Hyung S Sough
*Assistant Examiner*—Ngoc V Dinh
(74) *Attorney, Agent, or Firm*—Campbell Stephenson LLP

(57) ABSTRACT

A method, system, computer system, and computer-readable medium that enable a secondary host that is not the file system host to create a backup of a clone file set that shares at least one data block on a storage device with an active file set. Start and end locations are identified for a set of contiguous storage locations (referred to as a "chunk") on the storage device. Physical location information is obtained for each portion of a file contained in the chunk. The start and end locations and physical location information for portions of files contained in the chunk are provided to the secondary host, which sequentially reads data from the set of contiguous storage locations and constructs a copy of the file(s) making up the clone file set. The file(s) are written by the secondary host to a storage device to create a backup of the clone file set.

20 Claims, 8 Drawing Sheets

FIG. 1 *(Prior Art)*

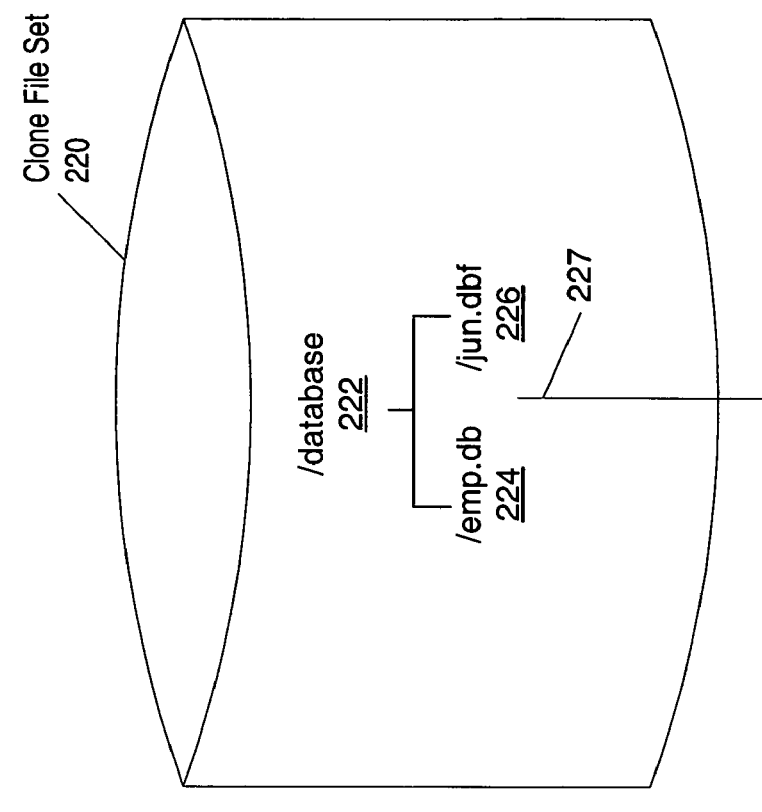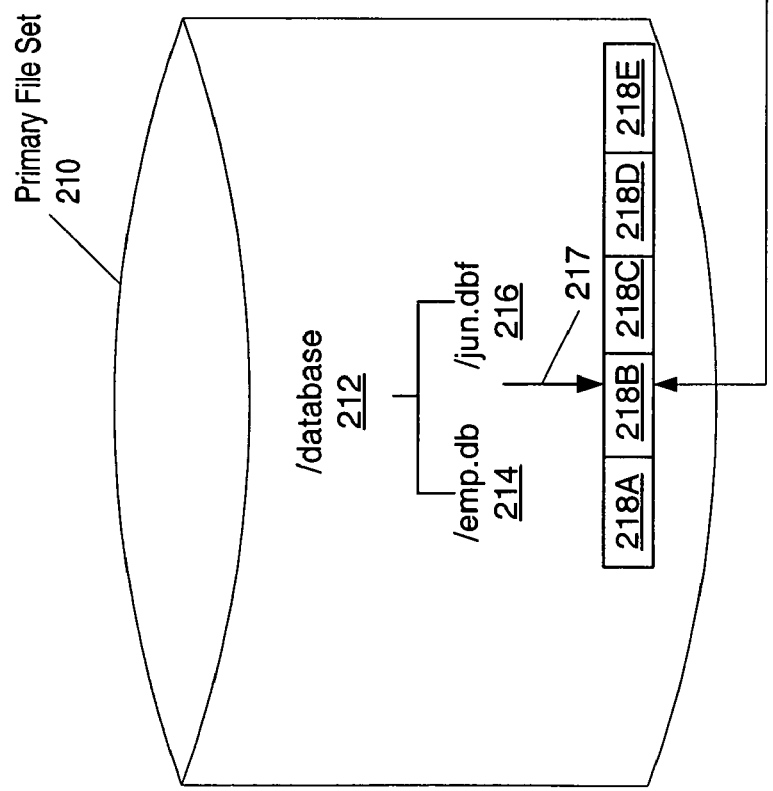
FIG. 2

Backup Clone

Backup Server Processes Mapping Information

Backup Server Processes Change In Mapping Information For File

EFFICIENT OFF-HOST BACKUP OF A FILE SET CLONE

BACKGROUND OF THE INVENTION

A file system is software that manages files containing data, and a set of files managed by a given file system is referred to as a file set. A file system provides a "layer" of software in a computer system to manage storage space for files. This layer is between the operating system (which communicates directly with devices) on the computer system hosting the file system and an application program that uses the data in the files managed by the file system.

Primary data is "live" or production data used for business-specific purposes, and a clone is a persistent copy of the primary data. A clone is typically created for saving a copy of primary data at a given point in time. After the clone is created, typically no further write operations are made to the clone so that it continues to represent the primary data as a "frozen image" at the time the clone was created. Although the primary data continues to change, a clone serves as backup data that can be used in the event of failure of the computer systems, networks, or communication links, or for recovery from any other corruption of primary data. For mission-critical and other applications that must remain highly available, a complete copy of the primary data and the clones representing different points in time is often maintained.

Primary and clone file sets co-exist on one device and are managed by the same file system. When a clone is created, no data blocks are copied into the clone file set. Operations continue to update, add, and/or delete primary data. Whenever a file is modified, the original data is copied into the clone file set. Such a write operation is referred to as a Copy on Write (COW) operation. Therefore, for a modified file, there are some shared data blocks (unmodified blocks in the primary file set) and original data blocks that are "pushed" to the clone file set. Two sets of metadata are also maintained; one for the primary file set and another for the clone file set. Examples of metadata maintained by the file system include access permissions, security data, and so on.

Because a clone file set shares some data blocks on the same device with the primary file set, backing up a clone file set uses processing resources on the host of the file system that could otherwise be used for maintaining the primary file set. Most backup software writes files to backup storage on a file-by-file basis, reading all of the data for each file from a storage device and then writing the data for that file to a backup storage device. Because a single file may have data in many non-contiguous locations on the storage device, the time to backup a file increases with the number of different non-contiguous locations that must be read to construct the file. A more efficient technique to write a file to backup storage is needed. Furthermore, because creating a backup copy can be resource-intensive, it is desirable to shift some of this processing load to another computer system.

What is needed is a way to quickly and efficiently allow a secondary host that is not the file system host to create a backup of a clone file set that shares data with an active file set.

SUMMARY OF THE INVENTION

The present invention enables a secondary host that is not the file system host to create a backup of a clone file set that shares data with an active file set. The clone file set shares at least one data block on a storage device with an active file set, which can be actively updated while a copy of the clone file set is written to backup storage.

In one embodiment, a set of contiguous storage locations on a storage device (referred to as a "chunk") is identified that contains data for at least two files. Contiguous sets of storage locations are identified to enable a secondary host to read data from the storage device sequentially without accessing a file system to read the data. The start location and the end location for the set of contiguous storage locations are provided to a reader (secondary host) of the storage device.

Physical location information for the portions of the files stored in the set of contiguous locations is obtained. This physical location information can be obtained from a file system hosting the active file set and the clone file set and may be in the form of a mapping catalog. The mapping catalog may contain a list of file identifiers and a set of locations of data blocks (identified by (start location, end location) tuples or (start location, number of locations) tuples) that contain data for each respective file identifier.

The reader/secondary host sequentially reads data from the set of contiguous storage locations on the storage device and constructs a copy of the file(s) making up the clone file set from the sequentially-read data. The file(s) can then be written by the secondary host to a backup storage device to create a copy of the clone file set without using resources of the file system host.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings.

FIG. 2 shows an example of a relationship between a primary file set and a clone file set.

The use of the same reference symbols in different drawings indicates similar or identical items.

DETAILED DESCRIPTION

Figure 1:
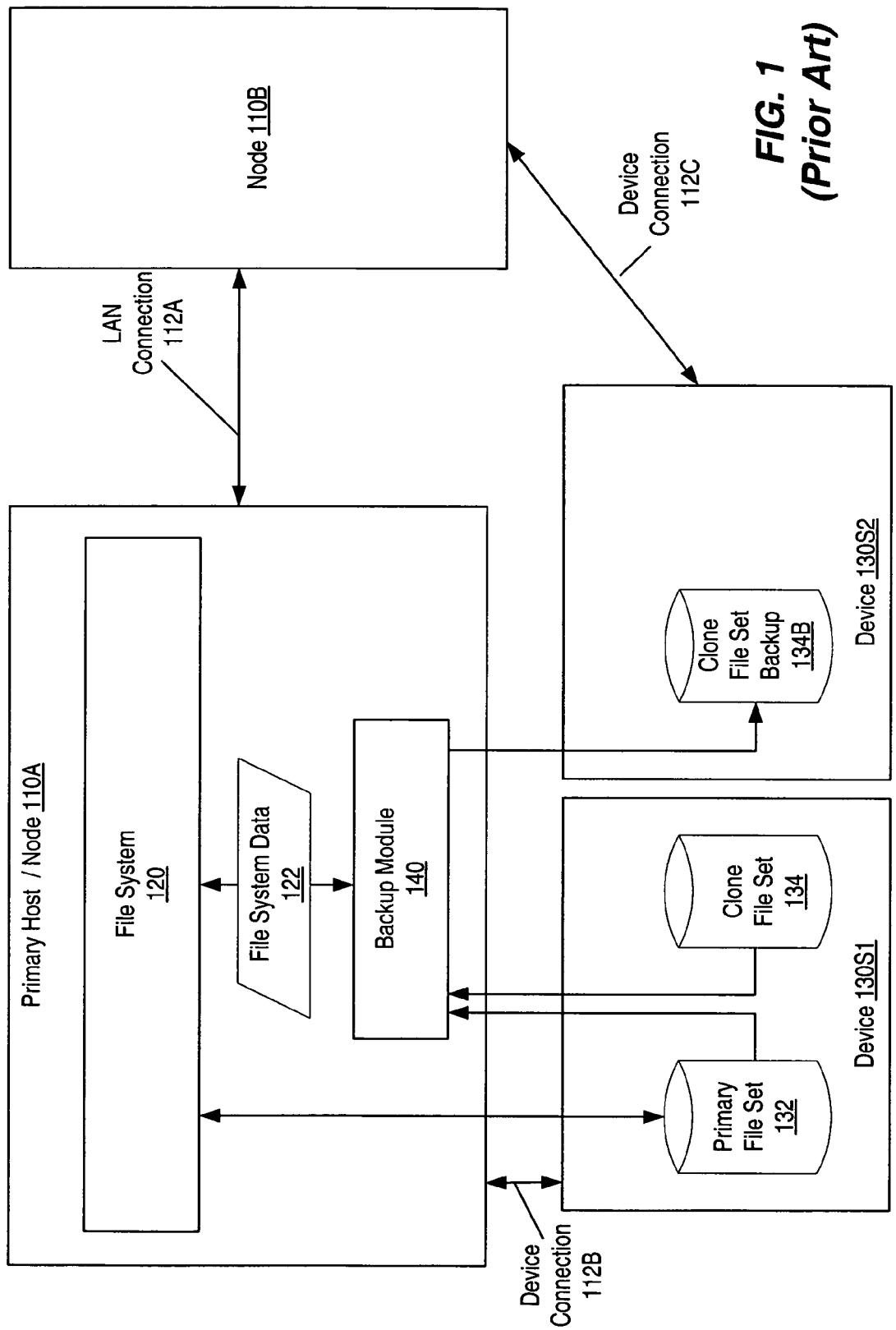
FIG. 1 shows an environment in which the present invention for backing up a clone file set can be used.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention enables reconstruction of a complete image of a file set as the file set appeared at the time that a clone file set was created. The clone file set has associated file system metadata. A clone file set can be mounted, accessed, and written just as a primary file set can be mounted, accessed and written. Clone file sets are useful for backup applications that require a consistent and stable image of an active file system. Clone file sets introduce some overhead to the system and to the application performing the write operation.

The present invention enables a secondary host that is not the file system host to create a backup of a clone file set that shares data with an active file set. The clone file set shares at least one data block on a storage device with an active file set, which can be actively updated while a copy of the clone file set is written to backup storage. In one embodiment, a set of contiguous storage locations on a storage device (referred to as a "chunk") is identified that contains data for at least two files. Contiguous sets of storage locations are identified to enable a secondary host to read data from the storage device sequentially without accessing a file system to read the data. The start location and the end location for the set of contiguous storage locations are provided to a reader (secondary host) of the storage device.

Physical location information for the portions of the files stored in the set of contiguous locations is obtained. This physical location information can be obtained from a file system hosting the active file set and the clone file set and may be in the form of a mapping catalog. The mapping catalog may contain a list of file identifiers and a set of locations of data blocks (identified by (start location, end location) tuples or (start location, number of locations) tuples) that contain data for each respective file identifier.

The reader/secondary host sequentially reads data from the set of contiguous storage locations on the storage device and constructs a copy of the file(s) making up the clone file set from the sequentially-read data. The file(s) can then be written by the secondary host to a backup storage device to create a copy of the clone file set without using resources of the file system host.

FIG. 1 shows an environment in which the present invention for backing up a clone file set can be used. Two nodes, 110A and 110B, are shown, where node 110A is the primary host for a file system 120, and node 110B is another node in communication with node 110A. Nodes 110A and 110B can be implemented as computer systems, each having a processor and a memory, as are well known in the art. Nodes 110A and 110B are shown as connected by a local area network (LAN) connection 112A, although a LAN is not necessary for implementation of the invention. Other types of connections between node 110A and 110B may include a wide area network, the Internet, or some other networking scheme, as are known in the art. FIG. 1 also includes device connection 112B between node 110A and device 130S1, and device connection 112C between node 110B and device 130S2. One of skill in the art will recognize that device connections 112B and 112C may be direct connections, such as Small Computer System Interface (SCSI), Integrated Drive Electronics (IDE), or fibre channel connections. The Internet or other network may also be used to connect the hosts 110A and 110B to the device, using an iSCSI connection.

Devices 130S1 and 130S2 are examples of devices used to store primary and clone file set data. Device 130S1 stores a primary file set 132 and a clone file set 134. Device 130S2 stores a backup of the clone file set 134, shown as clone file set backup 134B. Clone file set backup 134B is created by backup module 140 on node 110A. To create clone file set backup 134B, backup module 140 reads primary file set 132 and clone file set 134 and writes the data to clone file set backup 134B. Clone file set backup 134B therefore contains some data blocks copied from primary file set 132 and other data blocks copied from clone file set 134.

In the prior art system shown in FIG. 1, backup module 140 is running on node 110A, which is the primary host for file system 120, and can obtain file system data 122 from file system 120. File system data 122 may include, for example, a listing of files stored on each respective device along with the specific storage locations for each file on each respective device. File system data 122 may take form as a mapping catalog or as a listing of file identifiers, with each file identifier having one or more storage locations in the form of a tuple such as (start location, ending location) (also referred to as an "extent"). If a given file is stored in multiple non-contiguous storage locations, locations represented by different tuples store different portions of the file. A host that does not have access to file system 120, such as node 110B, does not have access to the storage locations for each file and must obtain such file system data 122 from the primary host of file system 120. Therefore, to interpret the data on one of devices 130S1 or 130S2, node 110B needs information about the storage locations for the files stored on the devices.

Creation of clone file set backup 134B by backup module 140 requires resources on node 110A, which makes fewer resources available for managing file system 120. It is desirable to preserve the resources on node 110A for file system 120 and to offload some of the processing resources for creating backups such as clone file set backup 134B to another node, such as node 110B. Processing performed by a host that is not the primary host for the file system is called "off-host" processing. Backing up a clone file set is discussed further with reference to FIG. 2.

FIG. 2 shows an example of a relationship between a primary file set and a clone file set. FIG. 2 shows primary file set 210 including database 212 and a clone file set 220. Database 212 is shown as an example of a file set, although the invention can also be used for other types of file systems and files. Database 212 includes an emp.db namespace component 214 and a jun.dbf namespace component 216. As shown by arrow 217, data blocks 218A through 218E are stored within primary file set 210.

In this example, clone file set 220 is logically identical to the primary file set 210 when clone file set 220 is created, but clone file set 220 does not contain actual data blocks. Clone file set 220 includes database 222 having emp.db namespace component 224 and jun.dbf namespace component 226. Rather than containing a copy of the actual data, however, clone file set 220 includes a pointer 227 to the primary file set 210 data blocks. One of skill in the art will recognize that pointer 227 may be implemented as an array of pointers to individual data blocks within primary file set 210 or as a single pointer to a list of pointers to data blocks. Clone file set 220 is created within the free space available to primary file set 210, and thereby minimizes the use of storage space. The following example describes creation of a clone file set in further detail.

Figure 3A:
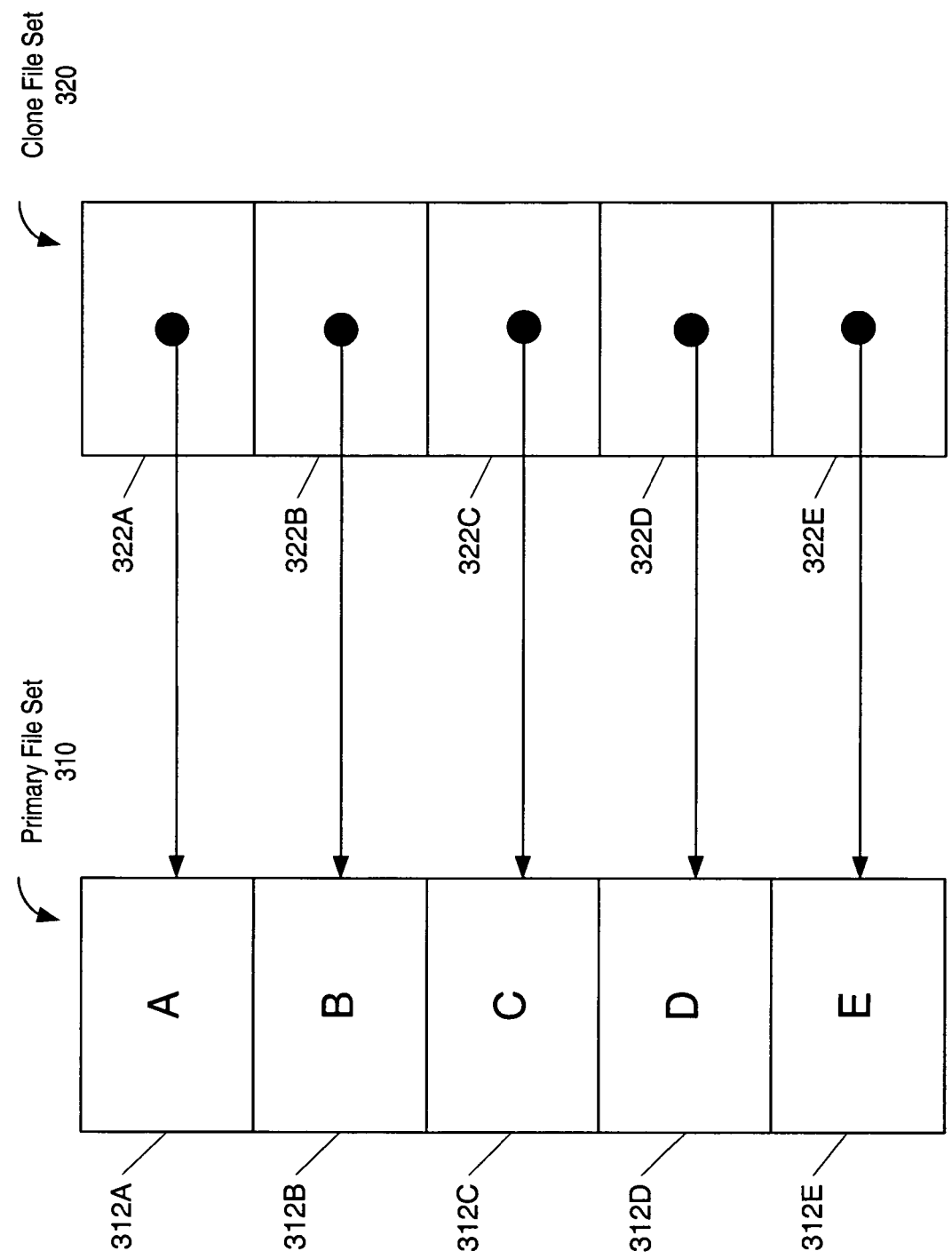
FIGS. 3A and 3B show a write operation to a primary file set and the copy-on-write operation to the clone file set.
Figure 3B:
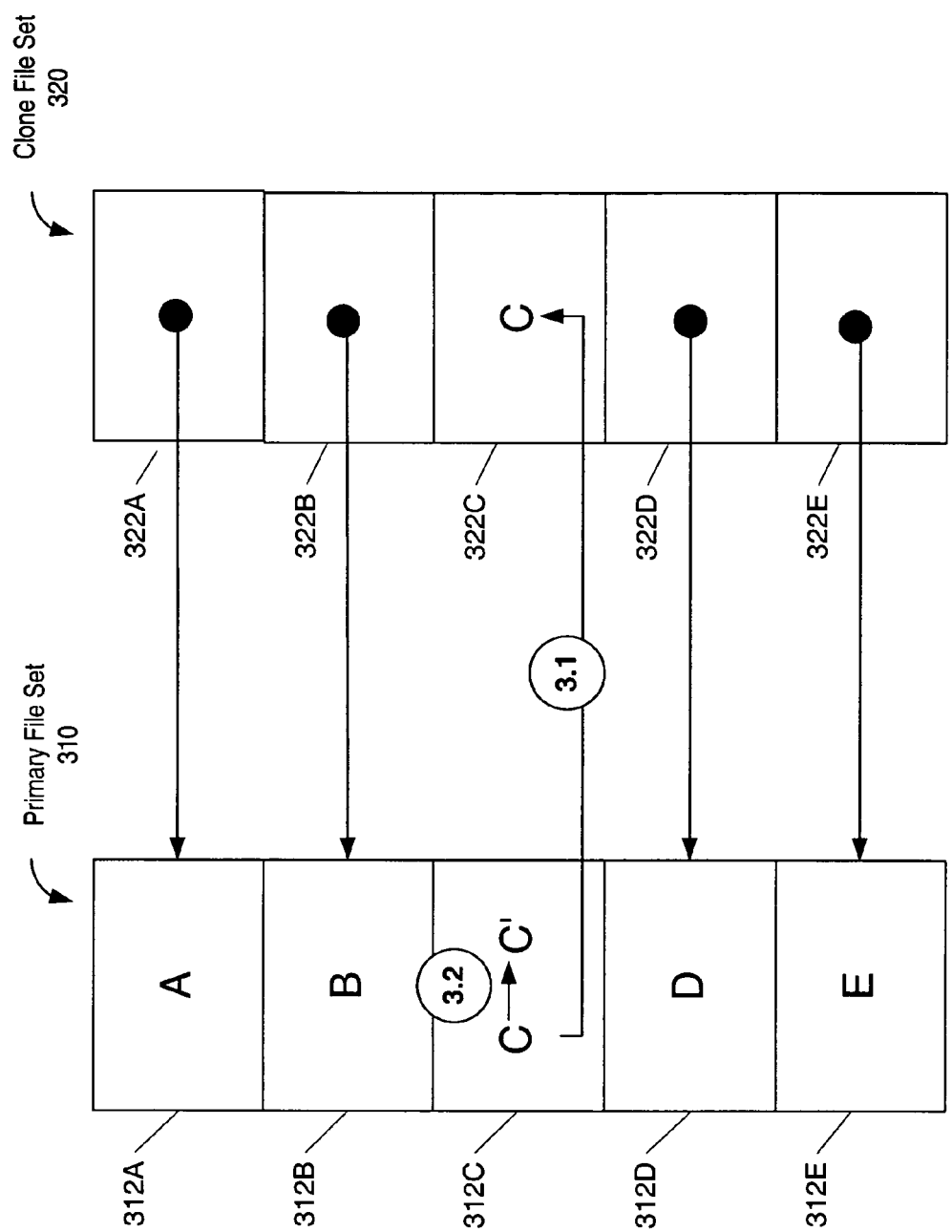

FIGS. 3A and 3B show a write operation to a primary file set and the copy-on-write operation to the clone file set. In FIG. 3A, each data block of a primary file set 310 is represented by one of blocks 312A, 312B, 312C, 312D or 312E. FIG. 3A shows a clone file set 320, with each block 322A through 322E containing a pointer to a corresponding block 312A through 312E in primary file set 310. As shown in FIG. 3A, clone file set 320 represents the state of the data at the time the clone file set 320 is created.

In FIG. 3B, block 312C is updated, having originally containing a value of "C." Before block 312C is updated with new data having a value of "C'", the original data having a value of "C" is copied to clone file set 320 block 322C, as shown in action 3.1. Block 312C is then updated with the new value of "C'", as shown in action 3.2. This technique is called the copy-on-write technique, which allows clone file set 320 to preserve the information necessary to reconstruct the image of the primary file set 310 at the point in time when clone file set 320 was created.

Every update or write operation does not necessarily result in copying data to the clone file set. In this example, subsequent updates to block 312C, now containing "C'," are not copied to clone file set 320 because the original image of block 312C containing a value of "C" is already saved.

Combining the unchanged data of primary file set 310 with the original data of the corresponding clone file set 320 enables an exact image of the corresponding primary file set (here primary file set 310), as of the point in time when the clone file set was created, to be recovered. For example, a backup of clone file set 320 would contain copies of data blocks 312A, 312B, 312D, and 312E from primary file set 310 and a copy of data block 322C from clone file set 320.

Figure 4:
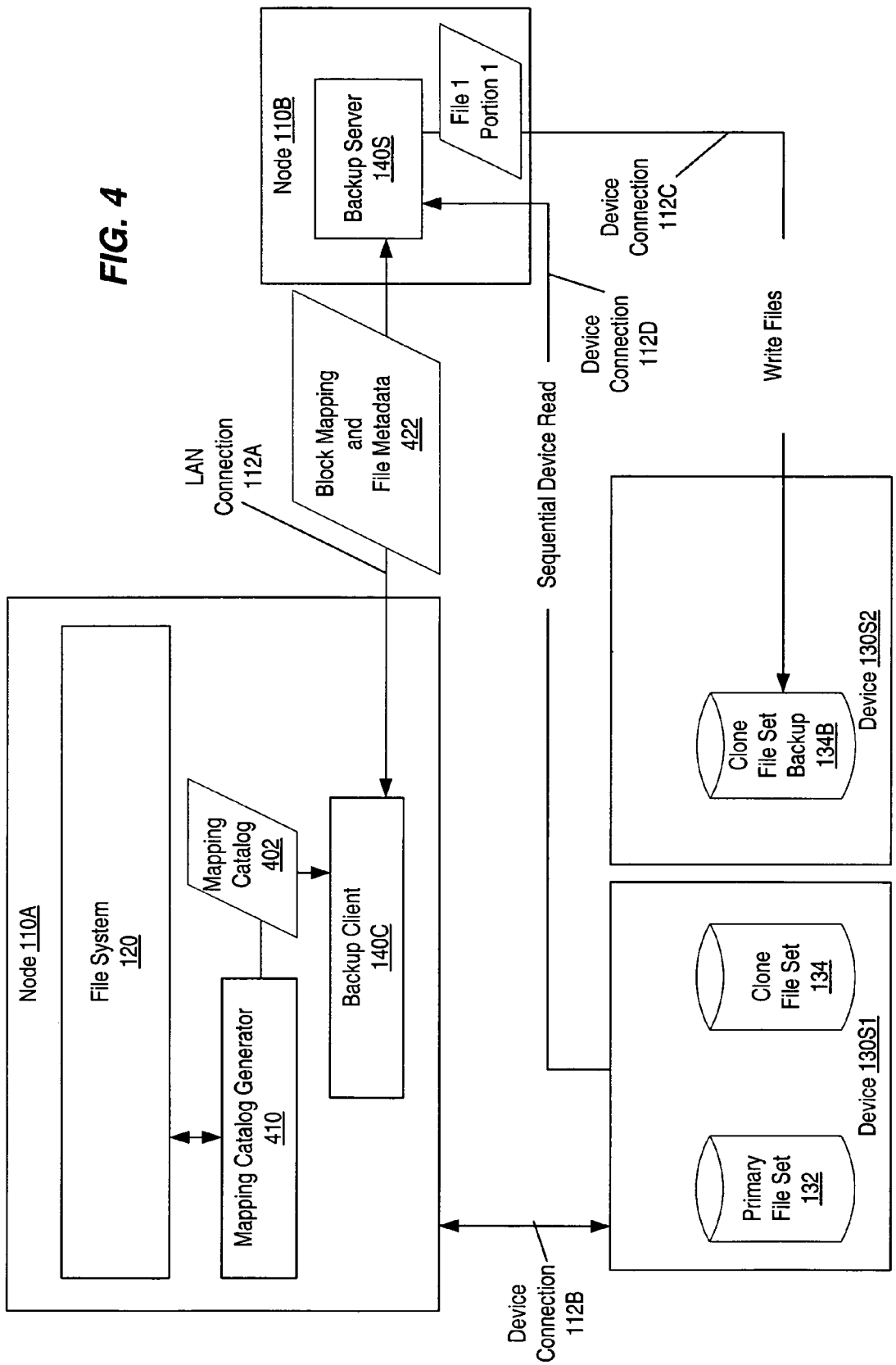
FIG. 4 shows an example of a system for backing up a clone file set in accordance with one embodiment of the invention.

FIG. 4 shows an example of a system for backing up a clone file set in accordance with one embodiment of the invention. Some system elements have already been described with reference to FIG. 1. In this embodiment, instead of the FIG. 1 backup module 140 on node 110A, a mapping catalog generator 410 works in conjunction with a backup client 140C and backup server 140S to produce backups of requested data. Backup client 140C can be viewed as a client requesting a backup service from backup server 140S. Backup server 140S performs the backup of clone file set 134 as a service to backup client 140C. By providing a backup service on "off-host" node 110B, the system enables file system host 110A to expend its resources managing file system 120 without being disrupted to perform backup services as well. A direct device connection 112D between node 110B and device 130S1 has been added.

Mapping catalog generator 410, backup client 140C and backup server 140S are described herein as software components executing on respective nodes 110A and 110B, although the invention is not limited to such an implementation. The functionality performed by mapping catalog generator 410, backup client 140C, and backup server 140S can be implemented in hardware, firmware, or as one or more application-specific integrated chips that can be used in devices and/or appliances.

In the system of FIG. 4, mapping catalog generator 410 and backup client 140C execute on node 110A, which corresponds to the host of file system 120. Mapping catalog generator 410 obtains mapping information from file system 120 and provides a mapping catalog 402 of files managed by file system 120 to backup client 140C. In one embodiment, mapping catalog 402 is created by a volume manager software component (represented as mapping catalog generator 410) running on the node hosting backup client 140C. Using data from mapping catalog 402, backup client 140C selects a "chunk" of data to be read from device 130S1 and passes block mapping information and file metadata 422 for the chunk to backup server 140S via LAN connection 112A.

In this embodiment, backup client 140C serves as an identifying module, means, and/or instructions to identify a start location and an end location for a set of contiguous storage locations of a storage device. Mapping catalog generator 410 serves as an obtaining module, means, and/or instructions to obtain physical location information for the portions of files stored in the set of contiguous storage locations on the storage device. Backup client 104C also serves as a providing module, means, and/or instructions to provide the start location and the end location for the set of contiguous storage locations and the physical location information for the portions of the files to a reader (in this case, backup server 130S) of the storage device.

In response to the identification of a chunk, backup server 140S performs a sequential device read of device 130S1 via device connection 112D. A sequential device read operation reads "raw" data rather than the data as formatted by file system 120. Backup server 140S then uses block mapping information and file metadata 422 to construct files from the sequential data. An example of a file under construction is File 1 Portion 1, shown in memory of node 110B. Note that file construction is handled by backup server 140S rather than by using resources of file system host 110A. Backup server 140S then writes the files to clone file set backup 134B on device 130S2 via device connection 112C. The sequential read operation and the write operation by backup server 140S are shown as being performed via device connections 112D and 112C, although, as mentioned earlier, other types of connections between backup server 140S and devices 130S1 and 130S2 are within the scope of the invention.

Figure 5:
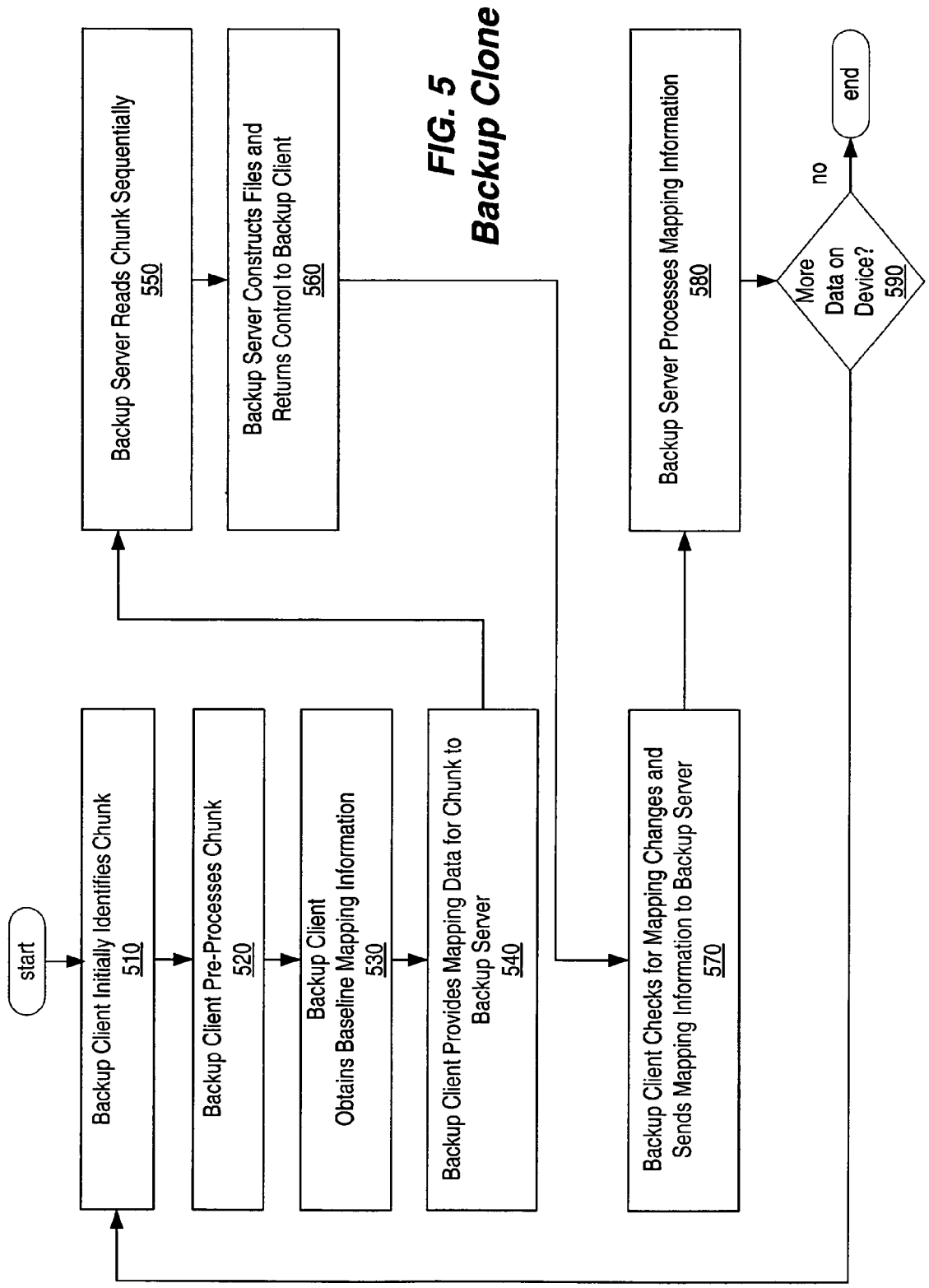
FIG. 5 is a flowchart of a method for backing up a clone file set in accordance with one embodiment of the invention.

FIG. 5 is a flowchart of a method for backing up a clone file set in accordance with one embodiment of the invention. For illustration purposes, the actions of FIG. 5 are described as being performed by backup client 140C and backup server 140S of FIG. 4. However, the method of FIG. 5 is not limited to use in a system such as the embodiment shown in FIG. 4.

Referring to FIG. 5, in "Backup Client Initially Identifies Chunk" step 510, backup client 140C determines a set of contiguous storage locations, referred to as a "chunk," to identify to the backup server to be sequentially read. Such chunks may be initially pre-determined as a certain number of bytes, such as 4K bytes. Preferably, the chunks are constructed such that a file having data stored in contiguous locations on the storage device is included in a single chunk.

From "Backup Client Initially Identifies Chunk" step 510, control proceeds to "Backup Client Pre-Processes Chunk" step 520. During pre-processing, the initial chunk size may be manipulated by the backup client to provide a better fit for the actual data being read. For example, a small gap between two "chunks" may be eliminated to form a single larger chunk.

Therefore, the size of each chunk read sequentially from the storage device may vary from one read operation to the next.

This pre-processing of a chunk may also include performing operations such as creating a mapping catalog for the files (or portions of files) in the chunk or reading data from an existing mapping catalog. In one embodiment, a mapping catalog is created by a volume manager software component (serving as mapping catalog generator 410 in FIG. 4) running on the node hosting backup client 140C. The volume manager software component is an application program that works in conjunction with file system 120 to manage logical volumes of data and can provide file system mapping information. However, any method of creating a list of file identifiers on the storage device and the respective (start location, end location) tuples for data blocks making up the files can be used. Making the physical location information available for use by backup client 140C enables backup client 140C to pass along file location information to backup server 140S. In some embodiments, file metadata for the files in the chunk also may be made available to backup server 140S. For example, file metadata may be saved on a shared storage device that can be accessed by the node hosting backup server 140S.

From "Backup Client Pre-Processes Chunk" step 520, control proceeds to "Backup Client Obtains Baseline Mapping Information" step 530. When backup client 140C identifies a chunk of contiguous data, backup client 140C may determine a file identifier for each file (or portion of a file) having data found in the chunk. In one embodiment, such a file identifier is called a "handle" for the file and is generated by the underlying file system or operating system. These file identifiers may be found by searching the mapping catalog made available in "Backup Client Pre-Processes Chunk" step 520 for files having portions stored in locations that are within the delimiters for the chunk. After obtaining the file identifiers, backup client 140C may then obtain the set of storage locations for each file (also referred to a mapping). The mapping obtained at this point provides a baseline mapping for the file and can be retained by backup client 140C. The baseline mapping may include the set of (start location, end location) tuples for each data block making up the file, as long as a portion of the file is included in the chunk. The baseline value of the mapping for the file can then be saved and compared to the value of the mapping at the time that the file is read later by backup server 140S.

In "Backup Client Provides Mapping Data for Chunk to Backup Server" step 540, backup client 140C provides the mapping data to backup server 140S. This mapping data for the chunk may include block mappings for the files in the chunk and/or file metadata. As mentioned previously, this mapping data may be made available by backup client 140C by writing the mapping data to a shared storage device or by sending a message containing the mapping data.

From "Backup Client Provides Mapping Data for Chunk to Backup Server" step 540, control proceeds to "Backup Server Reads Chunk Sequentially" step 550. Backup server 140S reads "raw" data from the device that includes the files to be backed up. For example, the files to be backed up may include the clone file set. Because the read operation sequentially reads data from the device rather than via file system 120, the sequential read operation can be completed much more quickly than would be the case if node 110A were to read the data via file system 120. Control then proceeds to "Backup Server Constructs Files and Returns Control to Backup Client" step 560. Using the mapping data provided by backup client 140C, backup server 140S reads the data provided for each file and constructs the files from the data. Because the chunk of data read by backup server 140S may have contained some, but not all, portions of a given file, some portions of files are retained in memory for processing later when subsequent chunks of data are read and processed. Backup server 140S returns control to backup client 140C.

From "Backup Server Constructs Files and Returns Control to Backup Client" step 560, control proceeds to "Backup Client Checks for Mapping Changes and Sends Mapping Information to Backup Server" step 570. Using the baseline mapping saved in "Backup Client Obtains Baseline Mapping Information" step 530, backup client 140C checks the baseline value of the mapping against the current value of the mapping maintained by file system 120. If the mapping shows that data blocks for the file have changed since the mapping catalog was constructed for backup client 140C, data regarding the changed files must be provided to backup server 140S. This data may be provided in the form of a "change indicator," which identifies whether a major or minor mapping change has occurred. In another embodiment, backup client 140C may call another module that determines whether a mapping change has occurred and provides a change indicator to backup client 140C. Details of one method for determining that a change has occurred to a file are provided with respect to FIGS. 6 and 7 below.

The processing described above with reference to "Backup Client Checks for Mapping Changes and Sends Mapping Information to Backup Server" step 570 enables a primary file set and clone file set to continue to be updated during the backup process. One of skill in the art will recognize that it is also possible to "freeze" activity to the primary file set and clone file set between the time the backup client 140C obtains an initial mapping of the file and the time that the backup server 140S writes the file to a backup storage device. While such a technique will simplify the backup process, such disruption may not be feasible in a highly available environment.

From "Backup Client Checks for Mapping Changes and Sends Mapping Information to Backup Server" step 570, control proceeds to "Backup Server Processes Mapping Information" step 580. The actions of the backup server in response to information about a mapping change are discussed further below with reference to FIGS. 6 and 7.

Referring again to FIG. 5, from "Backup Server Processes Mapping Information" step 580, control proceeds to "More Data on Device" decision point 590. If the last chunk of data on the device has been processed, the clone file set has been successfully backed up and the backup process ends. If data remain on the device that have not yet been processed, control returns to "Backup Client Initially Identifies Chunk" step 510, where backup client 140C identifies another chunk of data for processing.

Figure 6:
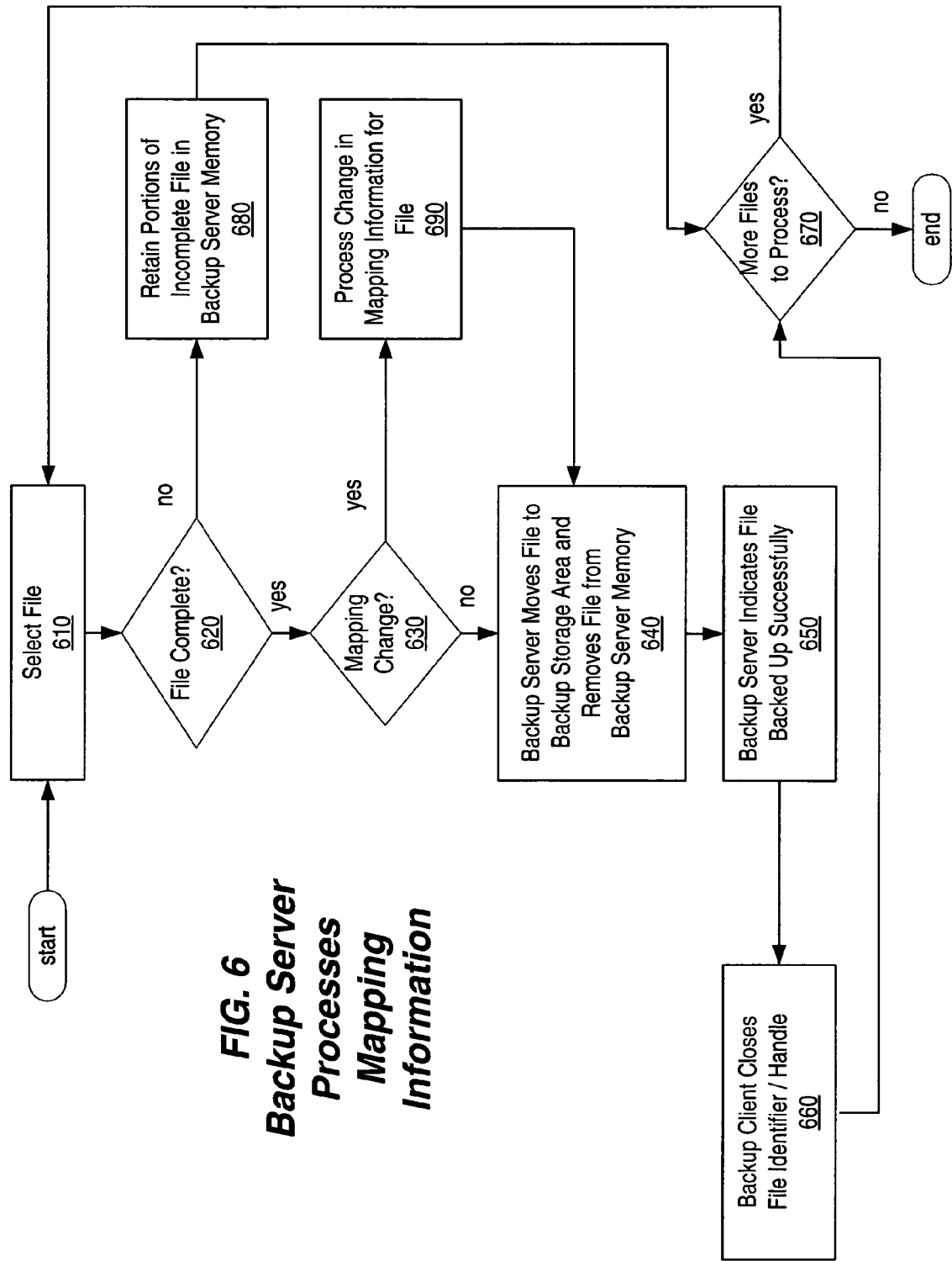
FIG. 6 shows a flowchart of an example of a method to implement the "Backup Server Processes Mapping Information" step of the flowchart of FIG. 5 in accordance with one embodiment of the invention.

FIG. 6 shows an example of a method to implement the "Backup Server Processes Mapping Information" step 580 of the flowchart of FIG. 5 in accordance with one embodiment of the invention. After the backup client 140C has provided mapping information for mapping changes to backup server 140S, backup server 140S processes the files that have not yet been backed up. In "Select File" step 610, backup server 140S selects a file that has been constructed from the data sequentially read from the device. Control proceeds to "File Complete" decision point 620, where a determination is made whether the file is complete. This determination can be made by examining the location information provided in the new mapping data for each file. If all locations for the file have been read, the file is complete.

At "File Complete" decision point 620, if the file is not complete, control proceeds to "Retain Portions of Incomplete File in Backup Server Memory" step 680. In one embodiment, the portions of the files are retained in memory of the backup server. In another embodiment, the portions of the files may be written to a storage area in the form of a linked list or other data structure. From "Retain Portions of Incomplete File in Backup Server Memory" step 680, control proceeds to "More Files to Process" decision point 670. If one or more files remain to be processed, control returns to "Select File" step 610, where another file is selected as described above. If no file remains to be processed, backup server 140S has completed processing the information regarding mapping changes provided by backup client 140C, and control returns to "More Data on Device" decision point 590 of FIG. 5.

At "File Complete" decision point 620, if the file has been completely constructed by backup server 140S, control proceeds to "Mapping Change" decision point 630. If a mapping change has occurred (as determined by comparison of baseline and current mappings for the file), control proceeds to "Process Change in Mapping Information for File" step 690, where backup server 140S processes the mapping change. "Process Change in Mapping Information for File" step 690 is described further below with reference to FIG. 7.

At "Mapping Change" decision point 630, if no mapping change has occurred to the file being processed, control proceeds to "Backup Server Moves File to Backup Storage Area and Removes File from Backup Server Memory" step 640. Backup server 140S can back up the file by writing the file to the backup storage area. The backup storage area may be any type of persistent storage device, as are known in the art. Backup server 140S also removes information about the file from memory so that additional processing of the file does not continue by backup server 140S. Control then proceeds to "Backup Server Indicates File Backed Up Successfully" step 650. Backup server 140S sends a message or communicates to backup client 140C that the file has been successfully backed up. In response to the message that the backup server 140S has backed up the file completely, control proceeds to "Backup Client Closes File Identifier/Handle" step 660, where backup client 140C removes the file from additional processing during the backup process of the current clone file set.

From "Backup Client Closes File Identifier/Handle" step 660, control proceeds to "More Files to Process" decision point 670, where backup server determines whether files remain to be processed. From this point, control continues as described above.

Figure 7:
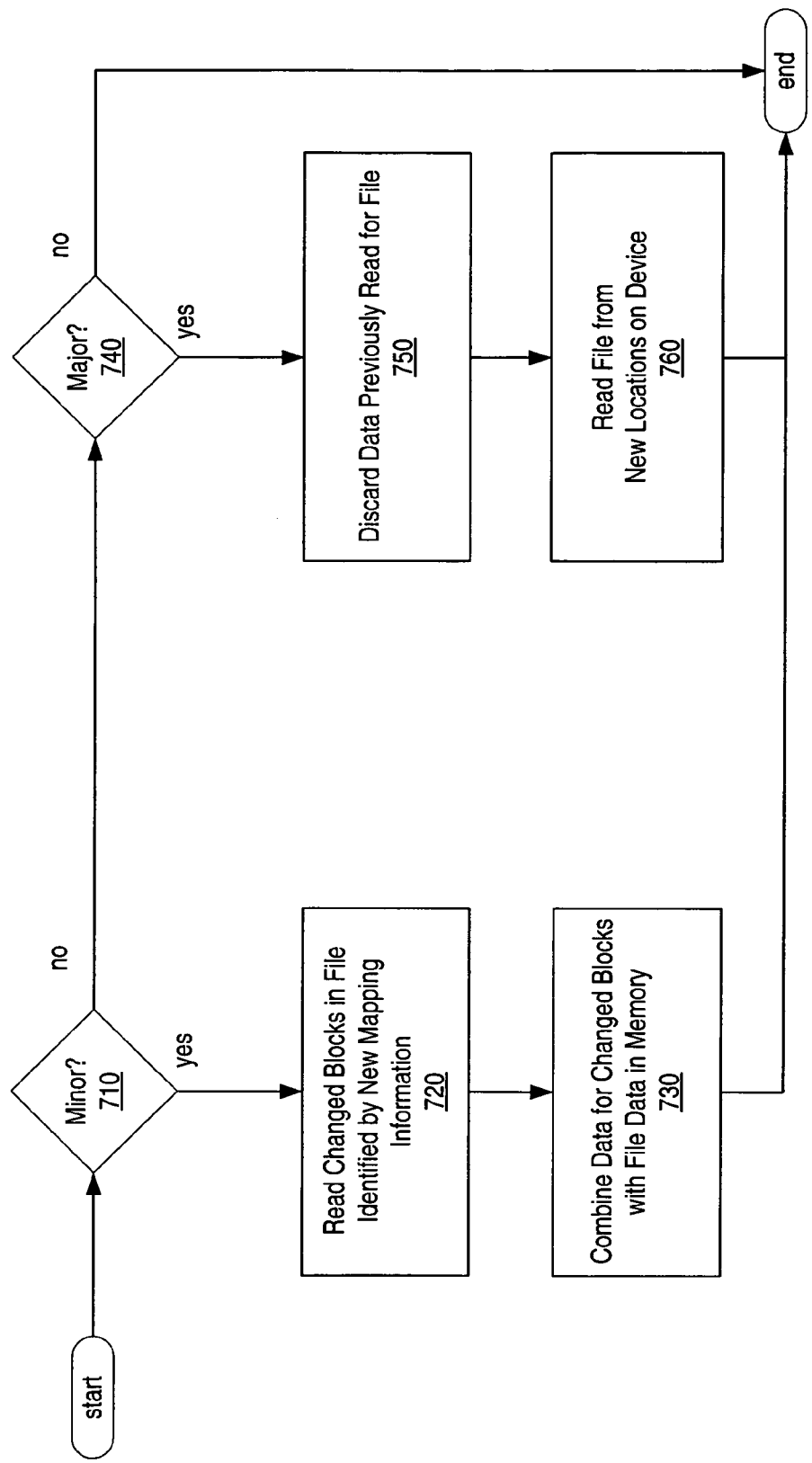
FIG. 7 is a flowchart of an example of a method to implement the "Process Change in Mapping Information for File" step of the flowchart of FIG. 6 in accordance with one embodiment of the invention.

FIG. 7 is a flowchart of an example of a method to implement the "Process Change in Mapping Information for File" step of the flowchart of FIG. 6 in accordance with one embodiment of the invention. In the embodiment described, backup client 140C has made a determination whether a mapping change has occurred for each file and has categorized such changes as "major" or "minor." Backup server 140S processes changes in mapping information for one file at a time, although several files may be processed at once within the scope of the invention.

In one embodiment, two types of changes to files are identified using the mapping indicator: a minor change and a major change. A minor change is indicated when one of the following conditions occurs: (1) a write operation has occurred to a data block in the file, overwriting contents of the data block (e.g., a copy-on-write operation); or (2) additional data storage locations have been allocated to the file. Therefore, when the data contents change and/or new storage locations are added to the file, the unchanged data previously read by the backup server is still accurate, but any changed data blocks must be re-read. A major change is indicated in the following conditions: (1) some data locations have been "freed," such as being made available to store new data; or (2) the file has been "reorganized," such that data in some blocks may have been moved. With a major change, data for the file may have been moved or deleted, and the file data previously read by the backup server may be inaccurate. Re-reading all storage locations for that file is appropriate for a major mapping change.

When a mapping change occurs, backup client 140C sends new mapping information for the file. Referring to FIG. 7, the processing of a changed file begins with "Minor" decision point 710. If the change is minor, control proceeds to "Read Changed Blocks in File Identified by New Mapping Information" step 720. Backup server 140S reads only the changed blocks for the file. Control then proceeds to "Combine Data for Changed Blocks with File Data in Memory" step 730. Backup server 140S reads the newly-read changed data and combines it with previously-read data for unchanged data blocks of the file. After re-constructing the file in memory, processing of the file is complete. Control returns to "Backup Server Moves File to Backup Storage Area and Removes File from Backup Server Memory" step 640 of FIG. 6, where the file is written to backup storage.

Referring again to FIG. 7, if the mapping change is not minor, control proceeds from "Minor" decision point 710 to "Major" decision point 740. If the mapping change is not a major change, the mapping change has failed both tests and may be in error.

From "Major" decision point 740, if the mapping change is major, control proceeds to "Discard Data Previously Read for File" step 750. Because the data may have been moved or overwritten, the data previously read by backup server 140S may be inaccurate and is discarded. Control proceeds to "Read File from New Locations on Device" step 760. The entire file is read from the locations indicated in the new mapping for the file. Control returns to "Backup Server Moves File to Backup Storage Area and Removes File from Backup Server Memory" step 640 of FIG. 6, where the file is written to backup storage. Control then proceeds as described above.

The present invention provides many advantages. A secondary host that is not the file system host can create a backup of a clone file set that shares data with an active file set. The active file set can be actively updated while a copy of the clone file set is written to backup storage. Resources of the file system host are not needed to create the backup copy of the clone file set.

Contiguous chunks of the storage device are identified to enable a secondary host to read data from the storage device sequentially without accessing a file system to read the data. The storage device is organized into chunks to provide the greatest amount of data for each file in a single read operation. Reading the device sequentially is much more efficient than reading files from the device via the file system.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The embodiments described herein are shown as operating in a LAN environment. However, the scope of the invention is not limited to a LAN environment, and other types of networking and/or computing environments may also use the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
   identifying a start location and an end location for a set of contiguous storage locations of a storage device, wherein
      the set of contiguous storage locations stores portions of a plurality of files;
   obtaining physical location information for the portions of the plurality of files stored in the set of contiguous storage locations on the storage device; and
   providing the start location and the end location for the set of contiguous storage locations and the physical location information for the portions of the plurality of files to a reader of the storage device;
   sequentially reading data from the set of contiguous storage locations for subsequent storage in a backup storage device in response to the reader receiving the start location, the end location and the physical location information.

2. The method of claim 1, wherein
   the reader constructs a copy of each respective portion of the portions of the plurality of files from the sequentially read data.

3. The method of claim 1, wherein
   the plurality of files includes at least one file that shares at least one data block on the storage device with an active file set.

4. The method of claim 1, wherein
   the obtaining the physical location information comprises obtaining the physical location information maintained by a file system hosting the plurality of files.

5. The method of claim 1, wherein
   the physical location information for each respective portion of the portions of the plurality of files comprises a file identifier and an associated set of tuples,
   each tuple in the associated set of tuples comprises a start location of a set of data blocks for a respective portion, and
   each tuple contains information to determine an end location of the set of data blocks for the respective portion.

6. The method of claim 5, wherein
   the reader uses the file identifier and the associated set of tuples to construct a copy of the respective portion from the data.

7. The method of claim 1, wherein
   the reader comprises a secondary host, and
   the secondary host is not a host of a file system managing the plurality of files.

8. The method of claim 1 further comprising:
   identifying a start location and an end location for a second set of contiguous storage locations of the storage device;
   obtaining physical location information for second portions of a plurality of files stored in the second set of contiguous storage locations on the storage device;
   providing the start location and the end location for the second set of contiguous storage locations and the physical location information for the second portions of the plurality of files to the reader of the storage device.

9. The method of claim 8 wherein
   the reader constructs a copy of a complete file from a copy of a first portion of the complete file and a copy of a second portion of the complete file, wherein the first portion is one of the portions stored in the set of contiguous storage locations and the second portion is one of the second portions stored in the second set of contiguous storage locations.

10. The method of claim 9 wherein
the reader stores the copy of the first portion in memory while sequentially reading the second set of contiguous storage locations.

11. A computer system comprising:
a processor to execute instructions, and
a memory to store the instructions, wherein
the instructions are configured to perform the method of claim 1.

12. A system comprising:
a processor;
a memory coupled to the processor, the memory storing instructions executable to:
receive a start location and an end location for a set of contiguous storage locations of a storage device, wherein
the set of contiguous storage locations stores portions of a plurality of files;
receive physical location information for the portions of the plurality of files stored in the set of contiguous storage locations on the storage device; and
sequentially read data from the set of contiguous storage locations for subsequent storage in a backup storage device in response to receiving the start location, the end location and the physical location information.

13. The system of claim 12,
wherein the memory further comprises instructions executable to construct a copy of each respective portion of the portions of the plurality of files from the sequentially read data.

14. The system of claim 12, wherein
the plurality of files includes at least one file that shares at least one data block on the storage device with an active file set.

15. A computer-readable medium comprising:
instructions to receive a start location and an end location for a set of contiguous storage locations of a storage device, wherein
the set of contiguous storage locations stores portions of a plurality of files;
instructions to receive physical location information for the portions of the plurality of files stored in the set of contiguous storage locations on the storage device; and
instructions to sequentially read data from the set of contiguous storage locations for subsequent storage in a backup storage device in response to receiving the start location, the end location and the physical location information.

16. The computer-readable medium of claim 15,
further comprising instructions to construct a copy of each respective portion of the portions of the plurality of files from the data.

17. The computer-readable medium of claim 15, wherein
the plurality of files includes at least one file that shares at least one data block on the storage device with an active file set.

18. A method comprising:
generating information about a first node, wherein
the first node comprises a storage device, and
the information identifies:
a start location and an end location for a set of contiguous storage locations of the storage device, wherein the set of contiguous storage locations stores a portion of a clone file set of an active file set;
a plurality of files having data stored in the set of contiguous storage locations; and
for at least one location of the set of contiguous storage locations, which file owns data stored therein; and
sending the information to a second node, wherein the second node comprises a reader that sequentially copies data from the contiguous storage locations of the storage device in response to the reader receiving the start location, the end location.

19. The method of claim 18, wherein
the active file set comprises a plurality of storage locations of a storage device, and
the clone file set comprises:
a corresponding storage location for each of the plurality of locations of the active file set;
and a pointer pointing from each storage location of the clone file set to the corresponding location of the active file set.

20. The method of claim 18, further comprising:
processing a request to modify a first storage location of the active file set, wherein the processing comprises:
copying data from the first storage location of the active file set to a corresponding first storage location of the clone file set; and
deleting the pointer pointing from the corresponding first storage location of the clone file set to the first storage location of the active file set.

* * * * *